(12) United States Patent
Boiquaye

(10) Patent No.: US 6,249,712 B1
(45) Date of Patent: Jun. 19, 2001

(54) ADAPTIVE CONTROL PROCESS AND SYSTEM

(76) Inventor: William J. N-O. Boiquaye, 33 Yorkshire Ter., Apt. No. 7, Shrewsbury, MA (US) 01545

( * ) Notice: Subject to any disclaimer, the term of this patent is extended or adjusted under 35 U.S.C. 154(b) by 0 days.

(21) Appl. No.: 09/029,184

(22) PCT Filed: Sep. 25, 1996

(86) PCT No.: PCT/US96/15277

§ 371 Date: Feb. 25, 1998

§ 102(e) Date: Feb. 25, 1998

(87) PCT Pub. No.: WO97/12300

PCT Pub. Date: Apr. 3, 1997

Related U.S. Application Data

(60) Provisional application No. 60/004,328, filed on Sep. 26, 1995.

(51) Int. Cl.⁷ .................................................. G05B 13/02
(52) U.S. Cl. ................................................................ 700/31
(58) Field of Search ............................... 700/33, 44, 32, 700/51, 28, 29, 37, 30, 31

(56) References Cited

U.S. PATENT DOCUMENTS

| | | | |
|---|---|---|---|
| 4,349,869 | 9/1982 | Prett et al. | 700/39 |
| 4,634,946 * | 1/1987 | Moulds, III et al. | 318/561 |
| 5,038,269 | 8/1991 | Grimble et al. | 700/52 |
| 5,268,835 * | 12/1993 | Miyagaki et al. | 700/31 |
| 5,301,101 | 4/1994 | MacArthur et al. | 700/36 |
| 5,347,446 | 9/1994 | Iino et al. | 700/27 |
| 5,408,405 * | 4/1995 | Mozumder et al. | 700/31 |
| 5,424,942 * | 6/1995 | Dong et al. | 700/44 |
| 5,477,449 * | 12/1995 | Iino | 700/29 |
| 5,526,293 * | 6/1996 | Mozumder et al. | 395/500.2 |
| 5,646,870 * | 7/1997 | Krivokapic et al. | 395/500.05 |
| 5,740,033 * | 4/1998 | Wassick et al. | 700/29 |

OTHER PUBLICATIONS

E. Sachs et al. "Run by Run Process Control: Combining SPC and feedback Control" IEEE Transactions on Semiconductor Manufacturing vol. 8, No. 1, Feb. 1995, pp. 26–43.

* cited by examiner

Primary Examiner—William Grant
Assistant Examiner—Edward F. Gain, Jr.
(74) Attorney, Agent, or Firm—Theodore R. Touw

(57) ABSTRACT

A system for adaptively controlling a wide variety of complex processes, despite changes in process parameters and despite both sudden and systematic drifts in the process, uses response surfaces described by quadratic equations or polynomials of any order. The system estimates the dynamic component of a drifting process or system and thereby identifies the trend of output response variables of the controlled process. Using this information, the system predicts future outputs based on a history of past and present inputs and outputs, thereby recommending the necessary control action or recipe (set of input parameters) to cancel out the drifting trend. A specific embodiment is a system for the adaptive control of photoresist thickness, uniformity, and dispense volume in the spin coating of wafers in integrated circuit manufacturing. Methods used in the adaptive control system are adaptable to control many processes not readily modeled by physical equations.

4 Claims, 13 Drawing Sheets

ADAPTIVE CONTROL PROCESS AND SYSTEM

This application is related to U.S. Provisional Patent Application Ser. No. 60/004,328 filed Sep. 26, 1995, priority of which is claimed, and is related to international patent application PCT/US96/15277 filed Sep. 25, 1996.

TECHNICAL FIELD

This invention relates generally to automatic control systems. More particularly, it relates to systems and methods for control of processes using non-linear approximations to generate models of response variables.

BACKGROUND ART

In today's industry, it is desirable to have processes that are easily adaptable to different process specifications and targets while using the same production equipment. Moreover, more stringent quality specifications make it ever more difficult to use trial-and-error methods to attain these desired objectives. A control system enabling high process adaptability for different product specifications, even in the face of changing manufacturing conditions, is of special advantage. Such a control system's control strategy should not only allow for changes in product specifications, but also it should be able to recover the process after a maintenance operation or unknown disturbance. It should also be able to compensate for slow drifts and sudden shifts in a process and should have the ability to incorporate both economic and quality specifications in its objective criterion.

A common practice in industry today is to dedicate equipment to specific processes and produce the same product using the same recipe. However, with the incidence of cluster tools that are programmable to do various tasks (especially in the semiconductor industry), the need for flexibility and adaptability is widely felt. For instance, a change in a batch of chemical used in a process or a change in ambient temperature could result in manufacturing products not within specifications if the recipe is not changed appropriately.

At present, the process control methods practiced in industry are statistical process control (SPC) and automatic feedback control. These two methods are used virtually independent of one another and each is unable to address all the control issues mentioned above. The concerns discussed above have necessitated the development of this invention.

The application of adaptive control techniques in the aerospace industry is widespread and has been applied to autopilot design and other navigation equipment. Unfortunately, this has not been the case in many other industries. Even though the growth of the semiconductor industry has brought along with it many advances in science and technology, and especially advances in the computer industry, there has been relatively little process automation in the semiconductor fabrication industry. Thus, although one may see robots working in an assembly line, yet often most of the processes are running open loop. Such processes can continue to produce products until a large number of products that are out of specifications are manufactured and tested before an SPC system can issue a warning.

At present, some of the most popular process control methods practiced in industry are statistical process control (SPC), factorial design, and automatic feedback control. In SPC, a history of product statistics is measured and plotted together with the limits for acceptable products. Then when products consistently go outside of this range it signifies that the process has changed and action needs to be taken to rectify this process change. In factorial design, combinations of experiments are conducted off-line to determine the interdependencies of the variables and to generate linear regression models for further analytical work. Automatic feedback control is a well known field that seeks to control the outputs of system to track a reference input or such similar objective. This field has been well formalized for linear systems but the application of feedback theory to nonlinear processes and systems is quite a challenge. It is not surprising therefore that there have not been many advances in the area of process automation whereby processes are run in a closed loop without operator intervention. Since most manufacturing lines use machines, raw materials, and process chemicals, the modeling of the entire process is often intractable. Not only are typical real manufacturing processes very complex, but also they typically are nonlinear and not amenable to exact closed form solutions. Hence, methods such as automatic feedback control which rely on analytical mathematical models derived from differential equations of the process are limited. Even though factorial design can provide information about the variable interdependencies, yet its operation in a closed loop without the involvement of a human operator has not been attained heretofore.

Methods using ULTRAMAX software for control optimization have been described by C. W. Moreno, in the article "Self-Learning Optimization Control Software," (Instrument Society of America Proceedings, Research Triangle Park, North Carolina, June 1986) and C. W. Moreno and S. P. Yunker in the article "ULTRAMAX: Continuous Process Improvement Through Sequential Optimization" (Electric Power Research Institute, Palo Alto, Calif., 1992). Other related publications are the article by C. W. Moreno "A Performance Approach to Attribute Sampling and Multiple Action Decisions" (AliE Transactions. September 1979, pp. 183–197) and C. W. Moreno, "Statistical Progress Optimization" (P-Q System Annual Conference, Dayton, Ohio, Aug. 19–21, 1987, pp. 1–14). E. Sachs, A. Hu, and A. Ingolfsson, in an article entitled "Run by Run Process Control: Combining SPC and Feedback Control" (IEEE Transactions on Semiconductor Manufacturing, October 1991) discussed an application combining feedback and statistical process control, which used parallel design of experiments (PDOE) techniques in combination with linear run-by-run controllers.

U.S. Pat. No. 3,638,089 to Gabor discloses a speed control system for a magnetic disk drive having high- and low-level speed means. A feedback control loop compares index marks from a disk unit in conjunction with a counter unit driven by an oscillator to provide a reference level to drive a DC drive motor between a high-level speed above its normal speed, and a low-level speed below its normal speed. An open-loop system also provides high-level and normal speeds. The open-loop system includes a voltage-controlled oscillator (VCO), an amplifier, and an AC drive motor. U.S. Pat. No. 5,412,519 to Buettner et al. discloses a disk storage device which optimizes disk drive spindle speed during low power mode. This system optimizes power savings to the characteristics of the particular drive. A transition speed is recalibrated periodically, and adaptive control can be implemented in this system by altering the time between recalibration cycles, extending the time if little or no change has occurred, or shortening the time when a sample sequence indicates changing status or conditions.

U.S. Pat. No. 5,067,096 to Olson et al. discloses a target engagement system for determining proximity to a target.

This system uses target motion analysis to determine a target engagement decision for ground targets such as vehicles. The input to the engagement system is the target azimuth as a function of time. The target is estimated to be within range or out-of-range based on calculation of a ratio of time intervals of crossing specified target azimuth sectors.

U.S. Pat. No. 5,144,595 to Graham et al. discloses an adaptive statistical filter for target motion analysis noise discrimination. The adaptive statistical filter includes a bank of Kalman filters, a sequential comparator module, and an optimum model order and parameter estimate module.

U.S. Pat. No. 5,369,599 to Sadjadi et al. discloses a signal metric estimator for an automatic target recognition (ATR) system. A performance model in the form of a quadratic equation is partially differentiated with respect to a parameter of the ATR, and the partial differentiation allows solution for an estimated metric.

U.S. Pat. No. 5,513,098 to Spall et al. discloses a method of developing a controller for general (nonlinear) discrete-time systems, where the equations governing the system are unknown where a controller is estimated without building or assuming a model for the system. The controller is constructed through the use of a function approximator (FA) such as a neural network or polynomial. This involves the estimation of the unknown parameters within the FA through the use of a stochastic approximation that is based on a simultaneous perturbation gradient approximation.

Thus, a variety of methods for automatic control and especially for automatic target recognition, and systems using the methods have been developed for specific purposes, some of which do not depend on analytic mathematical models such as differential equations. Some of the methods used in the background art cannot deal with fast-drifting systems, and some rely on small perturbations of the input variables, so that a resulting goal function must lie within a limited range around the desired trajectory.

DISCLOSURE OF THE INVENTION

This invention provides features that enhance existing methods and provides new methods, resulting in a novel system that is extremely flexible and versatile in its applications. The methods of this invention can be applied, not only to systems and processes which can be modeled by differential equations, but also to processes which are described by quadratic or higher-order polynomial models. This invention is described in a Ph.D. dissertation entitled "Adaptive Control of Photoresist Thickness, Uniformity, and Dispense Volume in the Spin Coating of Wafers," submitted by the present inventor on Sep. 27, 1995 to the University of Vermont, the entire disclosure of which dissertation is incorporated herein by reference. This dissertation is available to the public at the Research Annex, Bailey Howe Library, University of Vermont, Burlington, Vt.

Nomenclature

The term "recipe" as used in this specification, means a vector or ordered set of input variables for a process to be controlled.

In most manufacturing operations, a tremendous amount of information on processes can be recorded and stored as historical information in databases. The approach of this invention takes advantage of such historical information. This is done by feeding historical data into a run-by-run sequential design of experiment (RBR SDOE) optimization routine, continuing with the optimization process and finally identifying the optimum operating point. Then models (linear or nonlinear) of the response variables, in terms of the input variables (recipe), can be generated at the optimum operating point. This RBR SDOE approach allows for the definition of multiple objective functions such as performance loss functions and hence allows the optimization (e.g. minimization) of a suitable performance measure while meeting constraints for input and response variables. Once these local models are generated, the nonlinear adaptive controller is initialized using the models. The approach used in this invention is rigorous, and it addresses the fundamental issue of nonlinearity in the uniformity surface response. The effects of uncontrolled variables, of variable interactions, and of second-order terms on the performance measure can be better accounted for using quadratic models. In general, linear models are often a sufficient approximation to the true behavior of the system far from the optimum but they are not very good for describing response surfaces in the region of the optimum. This is because the region of the optimum usually shows curvature that cannot be explained by linear relationships. Curvature is always accounted for by higher order terms. Furthermore, when interaction is present in multi-factor systems, linear models cannot adequately describe the "twisted plane" that results from the interaction. The controller of this invention is able to account for all these factors since it is a nonlinear controller.

Purposes, Objects, and Advantages

A major purpose of the invention is to provide an adaptive control system capable of automatically controlling a wide variety of complex processes despite changes in process parameters and despite drifts in the controlled process. A related purpose is to provide methods by which such a system can be implemented.

Thus an important object of the invention is a system for controlling a multi-variable process that cannot be readily modeled by physical equations. Another important object is a process control system that can detect the incidence of manufacturing problems after only a few products are manufactured. Another object is a process control system that can predict the possibility of manufacturing off-specification products. A related object is a system that can sound an alarm before off-specification products are manufactured, so as to avoid waste. These and other purposes, object, and advantages will become clear from a reading of this specification and the accompanying drawings.

Understanding of the present invention will be facilitated by consideration of the following detailed description of a preferred embodiment of the present invention, taken in conjunction with the accompanying drawings.

BRIEF DESCRIPTION OF THE DRAWINGS

FIG. 4b is a response-surface contour plot of photoresist thickness in nanometers as dependent variable vs. two independent variables: photoresist dispense speed in kilo-revolutions per minute (Krpm) and photoresist spread speed in kilo-revolutions per minute (Krpm), correspond to FIG. 4a.

FIG. 5b is a response-surface contour plot of standard deviation (one-sigma) of photoresist thickness in nanometers as dependent variable vs. two independent variables: photoresist dispense speed in kilo-revolutions per minute (Krpm) and photoresist spread speed in kilo-revolutions per minute (Krpm), corresponding to FIG. 5a.

MODES FOR CARRYING OUT THE INVENTION

Figure 1:
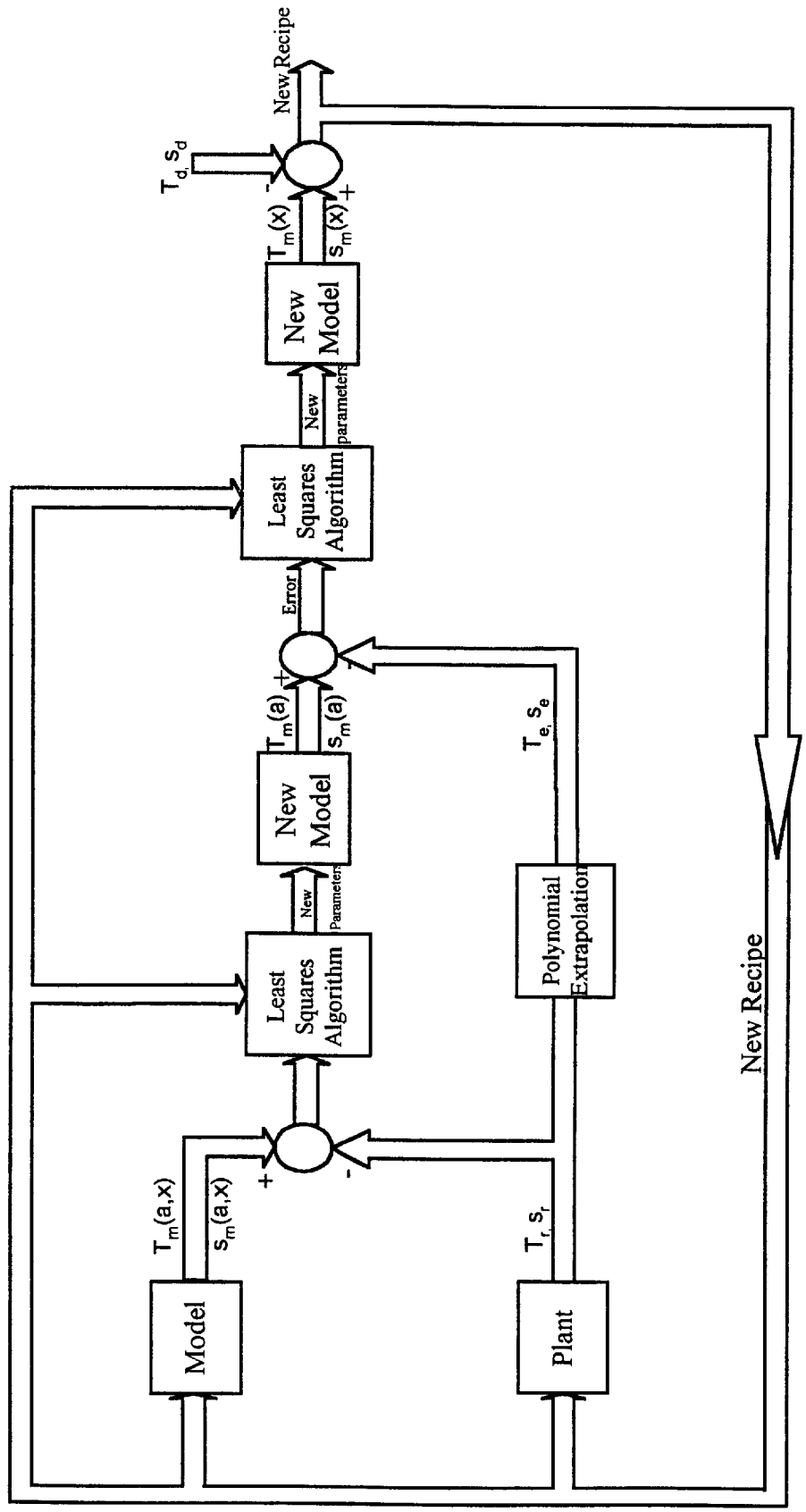
FIG. 1 is a diagrammatic view of a control system made in accordance with the present invention.

A general description of the adaptive control system in this invention is illustrated in FIG. 1 where the control system strategy is applied to the photoresist-coating of wafers in semiconductor integrated circuit (IC) manufacturing. The object here is to use the adaptive control system to obtain a photoresist film of specified mean thickness with the best possible uniformity by appropriately choosing the input variables or recipes to achieve this in the face of changes in process parameters. The process has about fourteen potentially important input variables and three output variables. The output variables are the cross-wafer mean thickness, the cross-wafer standard deviation or uniformity, and photoresist dispense volume. The dispense volume is actually an input variable which is also required to be minimized. In FIG. 1, $T_m(a)$ and $S_m(a)$ denote the predicted thickness and standard deviation respectively while $T_d$ and $S_d$ respectively represent the desired thickness and standard deviation.

As a first step to the application of this adaptive control system, a nominal empirical model of the system is obtained. This can be done by optimizing a compound performance loss function using sequential design of experiment techniques. This step can be replaced with parallel design of experiment techniques or by using physical models of the process. The optimization process will eventually identify the key input variables and the variables that have little or no influence on the response variables can be considered as constants. The resulting model in terms of the key variables may be of the form $$F(x) = C + \sum_{i=1}^{i=N}[G(i)*dX(i)] + \sum_{i=1}^{i=N}\sum_{j=1}^{j=N}[H(i,j)*dX(i)*dX(j)]$$  Equation (1)

where, $N$ = Number of input variables $C$ = Constant term $R$ = Reference vector $dX$ = $X - R$(If $R = 0$, then $dX = X$; $X$ is a vector of input variables - the recipe)

$G$ is the gradient vector $H$ is the Jacobian matrix

The series of steps in implementing this control system strategy is illustrated using a 2-variable ($x_1$, and $x_2$) process as an example. The quadratic model of a 2-variable process can be represented as $$Y = a_0 + a_1 x_1 + a_2 x_2 + a_{11} x_1^2 + a_{22} x_2^2 + a_{12} x_{12}$$  Equation (2)

Which in vector form will be $$y = \phi^T \theta_0$$  Equation (3)

where, $\phi^T = [1\ x_1\ x_2\ x_1^2\ x_2^2\ x_{12}]$ $\phi_0^T = [a_0\ a_1\ a_2\ a_{11}\ a_{22}\ a_{12}]$ Unlike future outputs of autoregressive moving average models, which can be expressed by recursive relations in terms of past outputs and past and present inputs, the resulting models given by Equations (1) and (2) are static, and hence cannot capture the dynamic behavior of a process. Hence, they lack the ability to be used in predicting the output of the process in a time-series sense. The calculation of the error term $$e(t) = y(t) - \hat{y}(t)$$  Equation (4)

in the least squares estimation process requires knowledge of the predicted output $$\hat{y}(t) = \phi(t-1)^T \hat{\phi}(t-1)$$  Equation (5)

This information is not available in models obtained by experimental design techniques. Hence, the need for a method of predicting future outputs is mandatory. In this invention polynomial extrapolation is applied to available historical data, in predicting the mean thickness and standard deviation for the next run. This then replaces what can be seen as the predictive part of autoregressive moving average models. What this suggests is that parameter estimation and prediction should be done somewhat independently with prediction following estimation in the same loop. Thus, two least squares estimators were used in implementing this control system strategy. The first least squares estimator is used in modeling the process behavior, up to the current run, by choosing parameters of the quadratic model such that the error between the actual responses measured and the model parameters are minimized in a least squares sense. Polynomial extrapolation is then used, in conjunction with historical data, to obtain the thickness and standard deviation of the next run. Then these extrapolated response values are used, as if they are the real outputs, to update the parameters of the second estimator. Thus, the resulting parameters of the second estimation process can be used to predict the responses of the drifting process if the recipe is known. If we were to continue to use the current recipe, the process would continue to drift. Given this current process drift as captured by the parameters of the second estimation process, this invention provides a way to find the correct recipe to apply in order that we cancel out the drifting trend and simultaneously satisfy all our response targets.

As an illustrative example, this invention was applied to the spin-coating of wafers in IC manufacturing. The problem statement is that a system is desired that would model the process of depositing a specified thickness of photoresist thin film (a 1000 nanometers (1 $\mu$m) film was studied in this example case), with the best possible uniformity using the least quantity of photoresist chemical. To apply this invention to the spin-coating process, the latter was exercised through a number of run/advice cycles of an optimization routine. The results are summarized as shown in FIG. 3. The figure clearly shows that the photoresist dispense volume was dramatically reduced from about 8 milliliters to about 4.3 milliliters for a 1000 nm film. This amounts to almost 50% reduction in chemical usage and translates to millions of dollars of savings for a typical modern semiconductor fabricating facility. It can be seen that the standard deviation reduced steadily run-by-run. The cross-wafer mean thickness, however, remained fairly constant at 1000 nm. The photoresist dispense volume is an input variable but it is also required to be minimized and so it is also defined as a calculated output variable. For physical constraint reasons the dispense volume could not be reduced below 4.3 milliliters, without affecting the quality of the films. So, the optimum value of the volume was set at 4.3 milliliters and assumed as a constant thereafter. Hence, hereafter only the cross-wafer mean thickness and standard deviation are considered as output variables to be optimized.

Figure 3A:
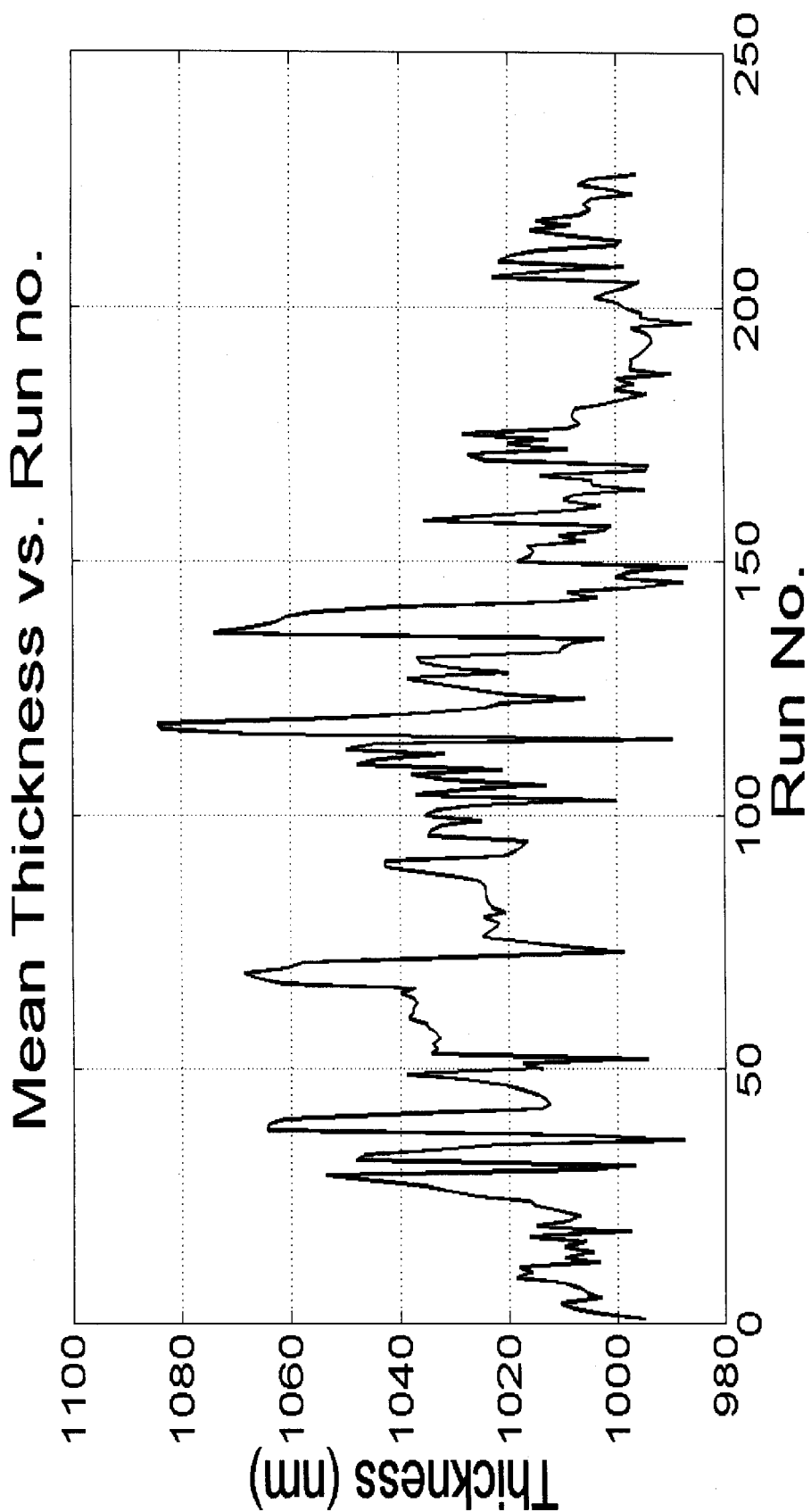
FIG. 3A is a graph showing mean photoresist thickness in nanometers vs. run number data in an optimization phase of an example process.
Figure 3B:
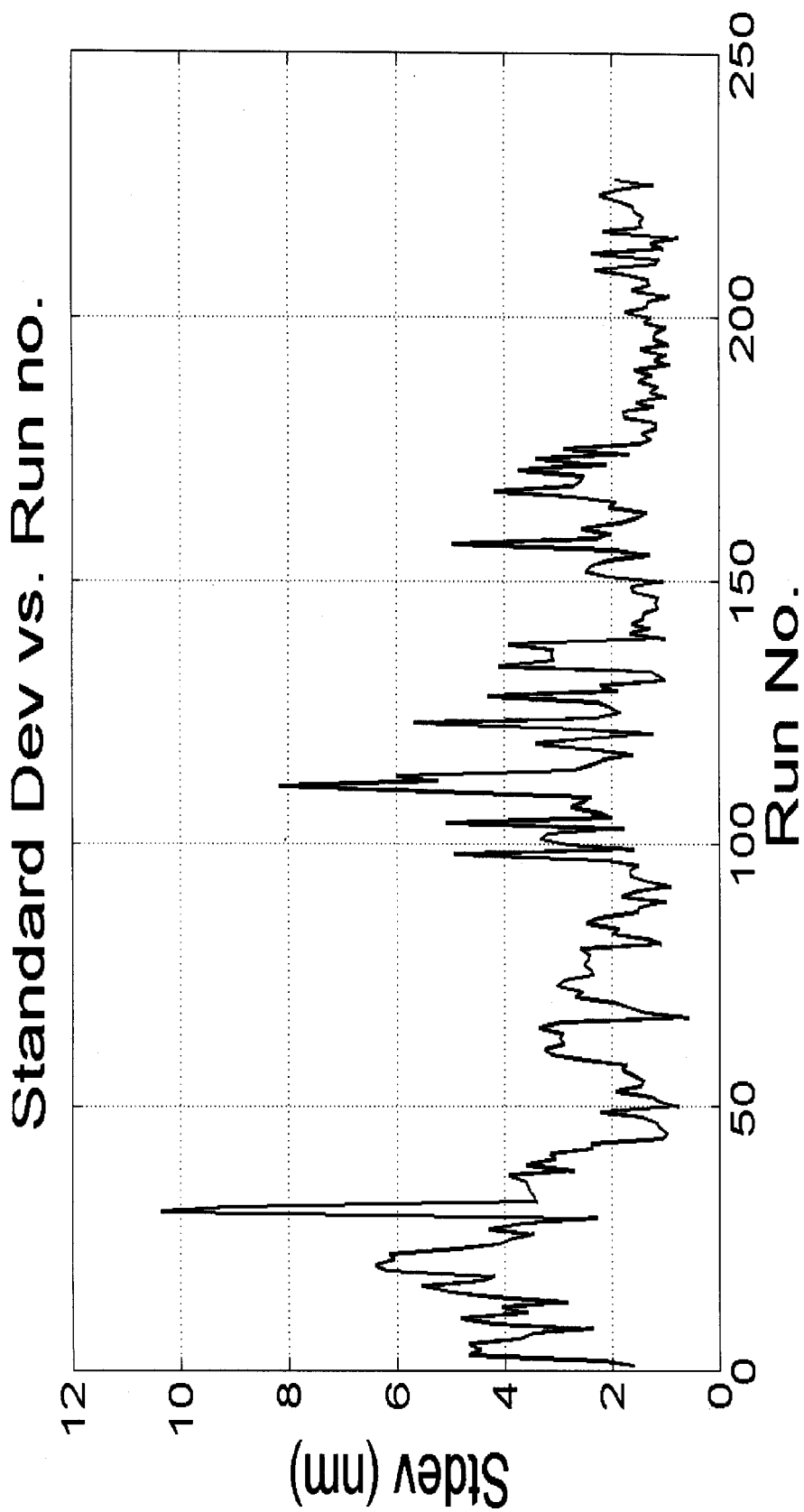
FIG. 3B is a graph showing standard deviation of photoresist thickness vs. run number data in an optimization phase of an example process corresponding to FIG. 3A.
Figure 3C:
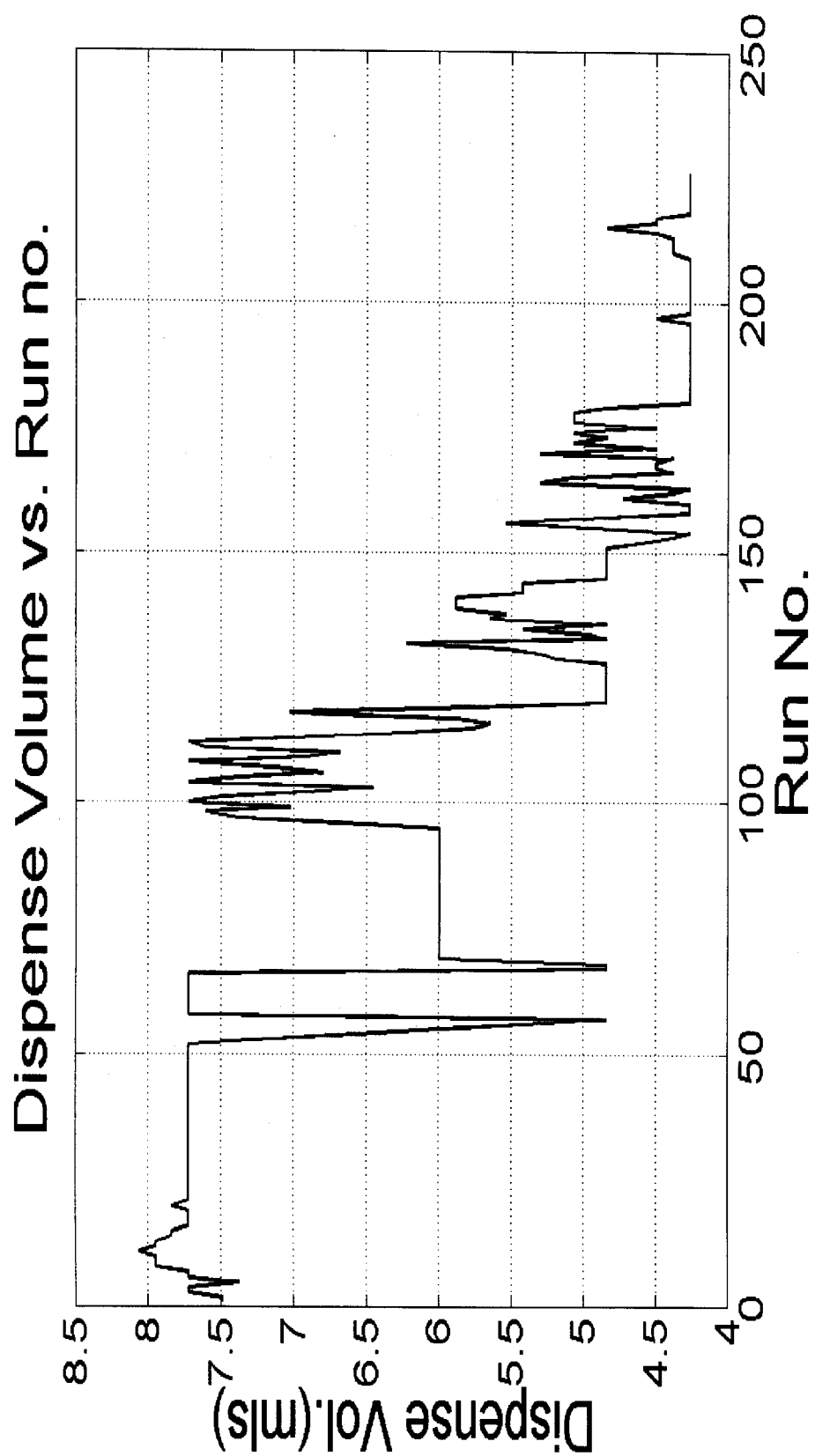
FIG. 3C is a graph showing photoresist dispense volume in milliliters vs. run number data in the example process of FIGS. 3A and 3B.
Figure 4A:
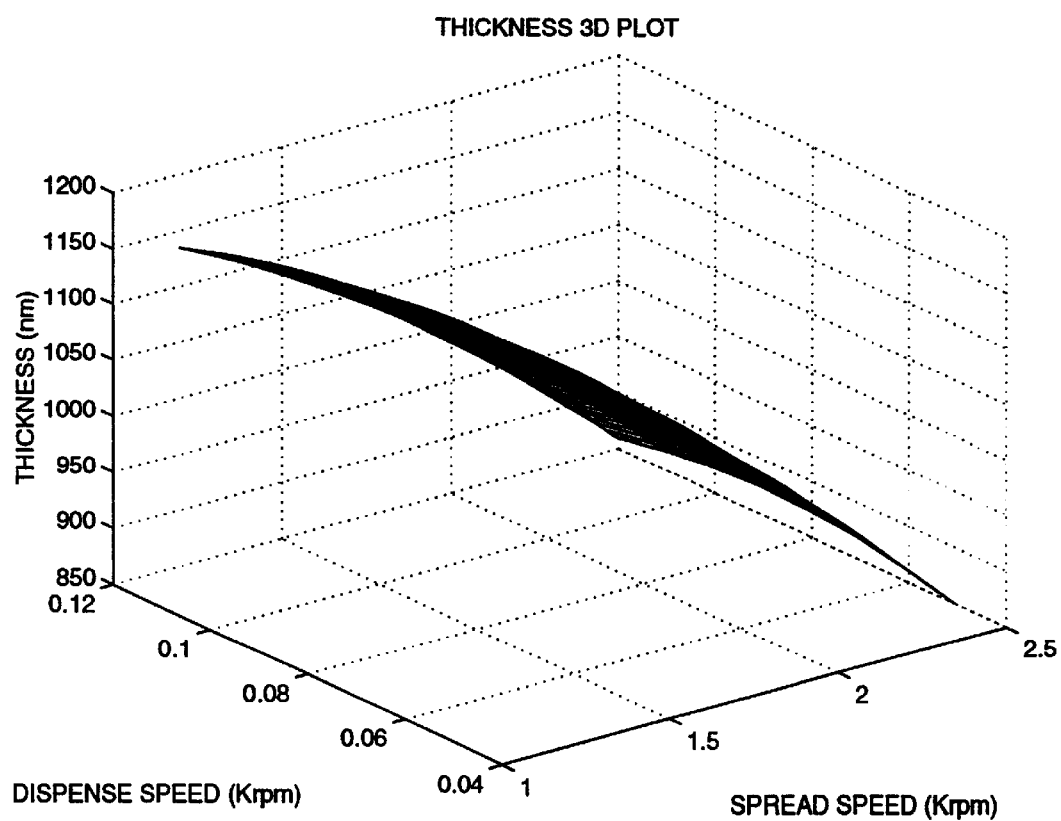
FIG. 4a is a three-dimensional response-surface plot of photoresist thickness in nanometers as dependent variable vs. two independent variables: photoresist dispense speed in kilo-revolutions per minute (Krpm) and photoresist spread speed in kilo-revolutions per minute (Krpm) in example process.
Figure 4B:
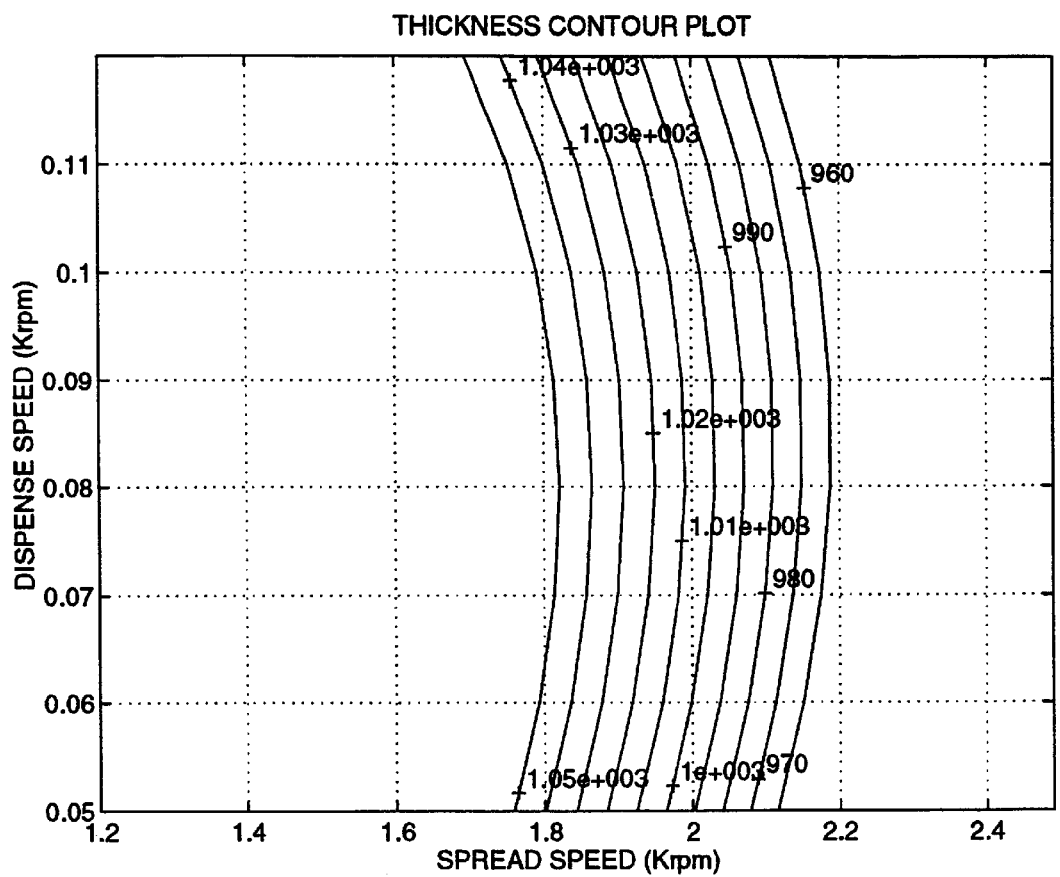
Figure 5A:
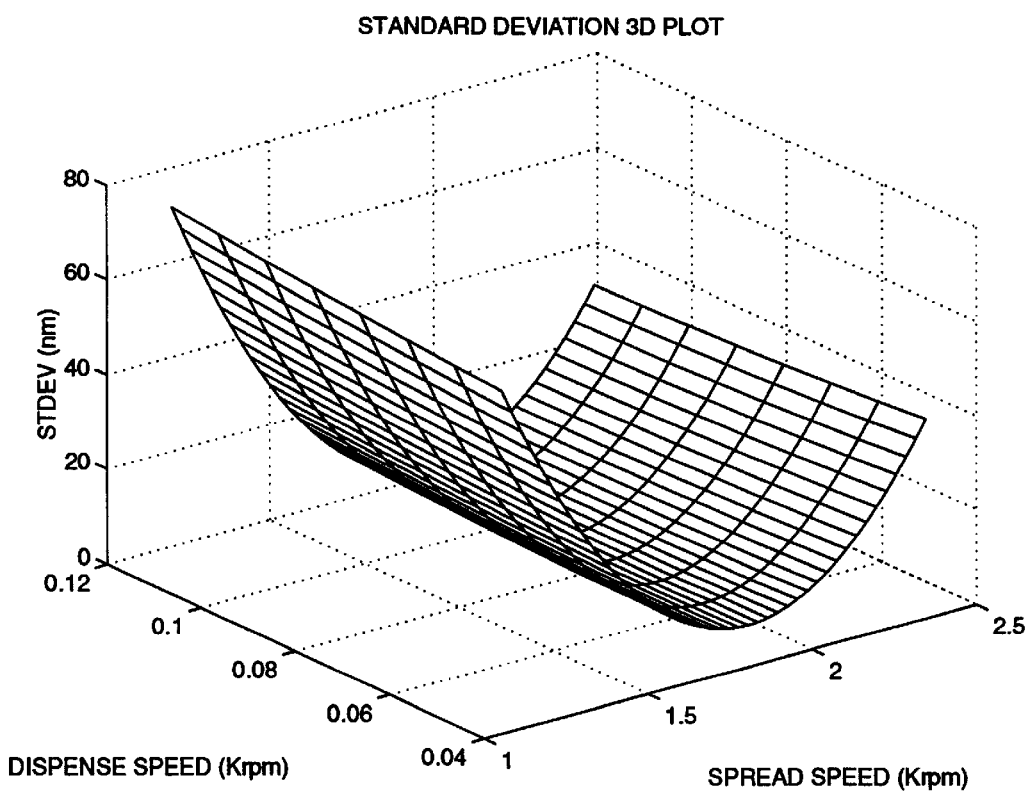
FIG. 5a is a three-dimensional response-surface plot of standard deviation of photoresist thickness in nanometers as dependent variable vs. two independent variables: photoresist dispense speed in kilo-revolutions per minute (Krpm) and photoresist spread speed in kilo-revolutions per minute (Krpm) in the example process of FIGS. 4a and 4b.
Figure 5B:
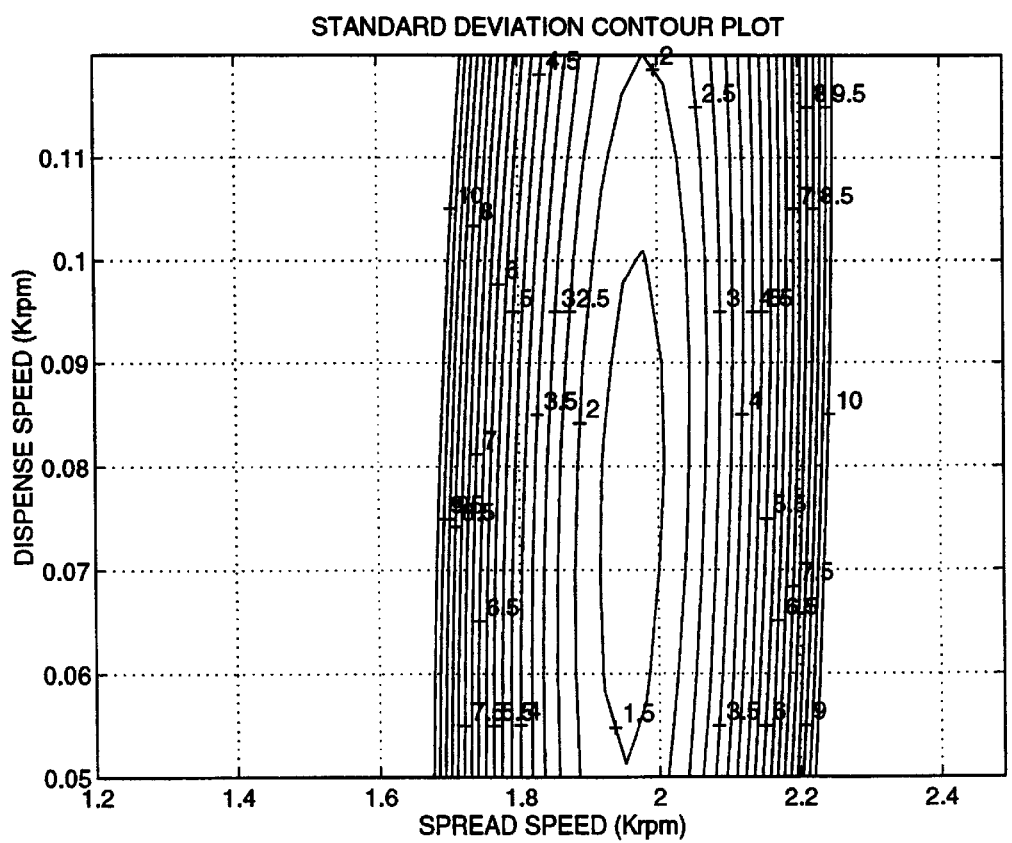

Models are generated from the optimization process above and several information such as the key variables and percentage contribution of the input variables to the response variables can be deduced from the models. 3D surface response plots can be generated from the models to give a pictorial view of the variable dependencies etc. FIGS. 4a, 4b, 5a, and 5b show 3D and contour plots of the film mean thickness and standard deviation with two independent variables, dispense speed and spread speed. Note that even though the optimization process drove the process to the neighborhood of the desired targets as shown in FIGS. 3A, 3B, and 3C it still exhibited large run-by-run variability particularly in the mean thickness and standard deviation. Thus, to reduce the run-by-run variability, the models generated from the optimization phase are used in initializing a novel adaptive controller.

The chronological sequence of events involved in engaging the novel adaptive controller from the start of the process is as follows. After the first wafer is spin-coated with photoresist, a cross-sectional mean thickness measurement is obtained using a measurement tool. Thereafter the real mean thickness $\bar{T}_r$ and sample standard deviation $\bar{s}_r$ are computed. Then, initial parameter values of the first estimator are chosen using the model coefficients determined from the optimization phase and these parameters are updated with the new process data as follows. Given the current recipe x, and the current parameters a and b, (x, a, and b being vectors), the model thickness and standard deviation can be calculated from Equation (1) as $\bar{T}_m(a, x)$ and $\bar{s}_m(b,x)$ respectively. A new set of parameters is chosen by minimizing the error between the model response and the real response. That is, the problem definition is:

$$\min[\bar{T}_r - \bar{T}_m(a, x)]^2 \qquad \text{Equation (6)}$$

subject to a $$\min[\bar{s}_r - \bar{s}_m(b, x)]^2 \qquad \text{Equation (7)}$$

subject to b
where
$T_m(a, x) = a_0 + a_1 x_1 + a_2 x_2 + a_{11} x_1^2 + a_{12} x_{12}$
$s_m(b, x) = b_0 + b_1 x_1 + b_2 x_2 + b_{11} x_1^2 + b_{12} x_{12}$
The actual iterative equations for implementing the least squares algorithm of Equations (6) and (7) are given below in Equations (8) and (9) as $$\hat{\theta}(t) = \hat{\theta}(t-1) + \frac{P(t-2)\phi(t-1)}{1 + \phi(t-2)^T P(t-2)\phi(t-1)} \qquad \text{Equation (8)}$$

$$\left[ y(t) - \phi(t-1)^T \hat{\theta}(t-1) \right]$$

$$P(t-1) = P(t-2) - \frac{P(t-2)\phi(t-1)\phi(t-1)^T P(t-2)}{1 + \phi(t-1)^T P(t-2)\phi(t-1)} \qquad \text{Equation (9)}$$

$$t \geq 1$$

with given initial estimate, $$\hat{\theta}(0), P(-1) = kP$$

where k is a large constant and P is any positive definite matrix, typically the identity matrix I; $\hat{\theta}(t)$, and $\phi(t)$ have already been defined in Equation (3).

Figure 6A:
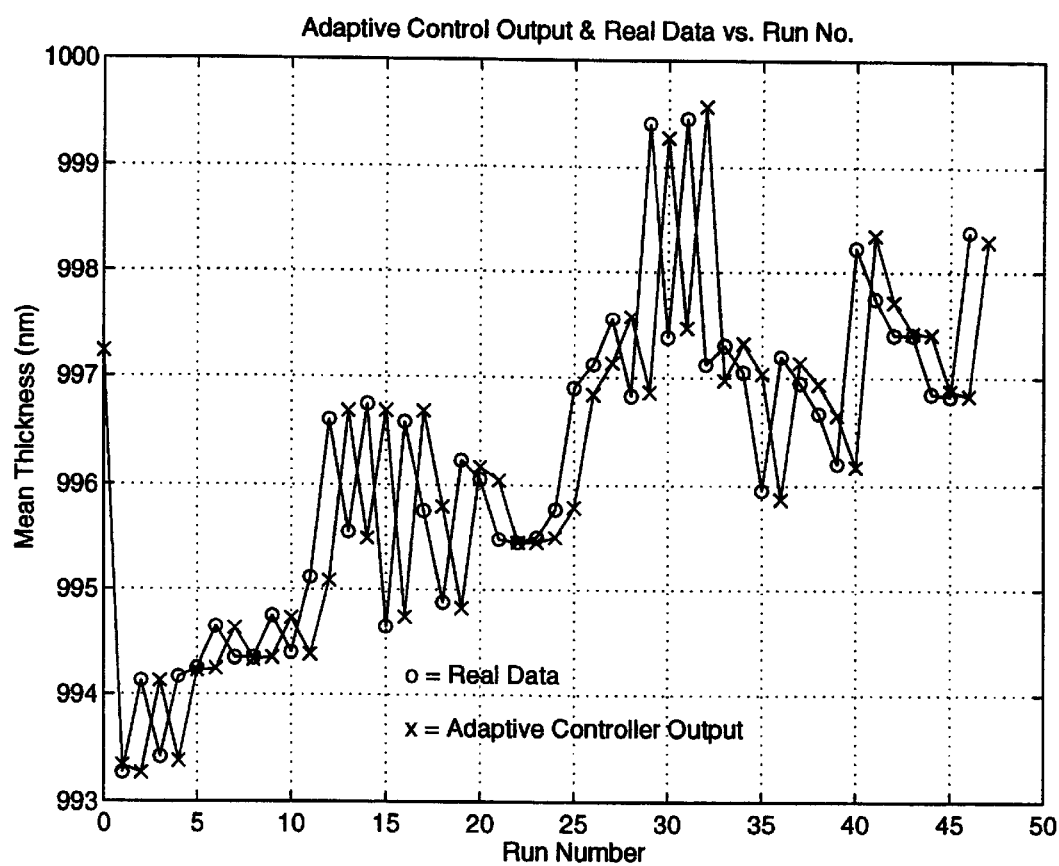
FIG. 6a is a graph showing real process output (o) and adaptive control (least-squares open-loop) simulated output (x) of mean photoresist thickness in nanometers as dependent variable vs. run number as independent variable for an example process.
Figure 6B:
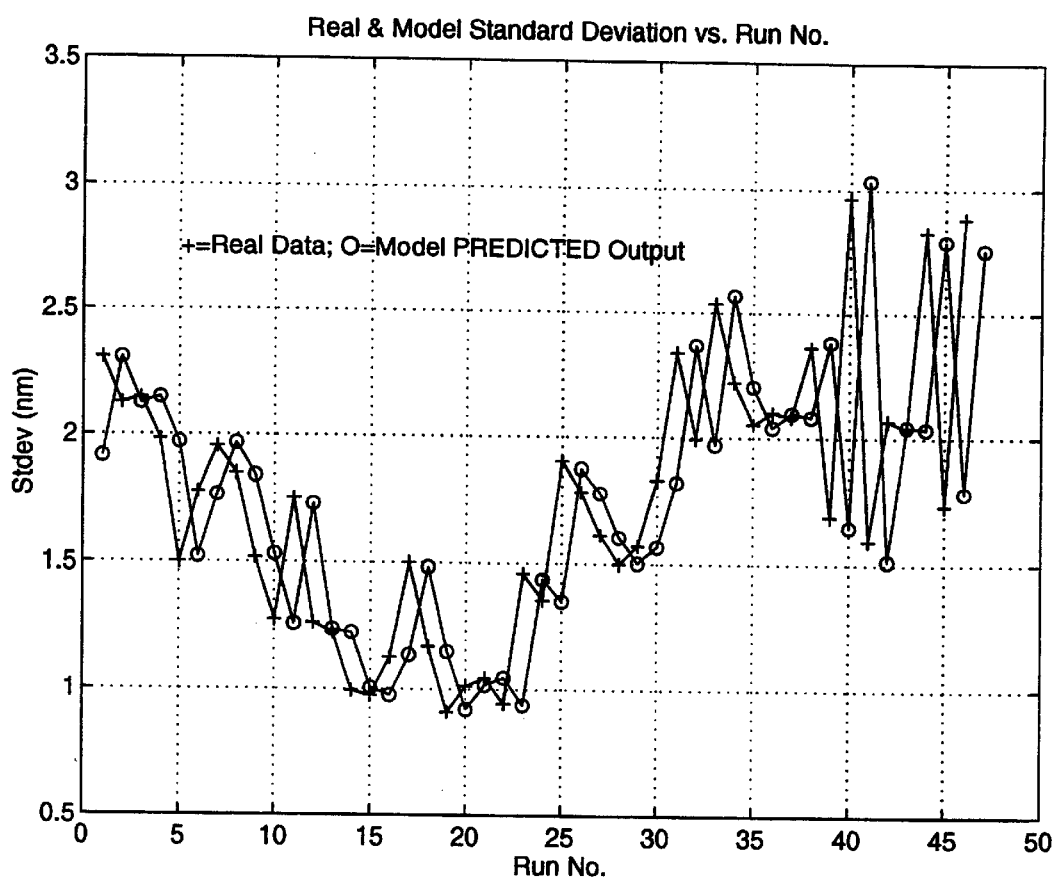
FIG. 6b is a graph showing real process output (+) and adaptive control (least-squares open-loop) simulated output (o) of standard deviation (one-sigma) of photoresist thickness in nanometers dependent variable vs. run number as independent variable for an example process.

To verify that this procedure actually succeeds in tracking the response variables, the least squares process was applied to a set of historical data and the result is presented in FIGS. 6a and 6b. From the graph it can be seen that the model developed tracks the response variables very well. However, since the response variables (thickness and standard deviation) are available after the fact, we expect that the estimator results will lag behind the current process by one run and this expectation is actually confirmed in the plots. This again affirms the need for the incorporation of a method of prediction in order that the estimator model output predictions will synchronize with the system outputs.

So, after two wafers are processed and the first estimator parameters are updated, sequentially after each data point is available using Equations (8) and (9), we obtain the model equations $T_{m2}, s_{m2}$ as given by Equation (6) and (7). Then, the first two data points are used as starting points in doing polynomial extrapolation to predict the value of the outputs for the third run; thereafter, the second estimator is engaged.

Let the extrapolated mean thickness and standard deviation for the third run be $\bar{T}_{e3}$ and $\bar{s}_{e3}$ respectively. Then using parameters a,b estimated by the previous estimator, as the initial parameter guess for the second estimator, the optimization problem becomes:

$$\min[\bar{T}_{e3} - \bar{T}_{m2}(a)]^2 \qquad \text{Equation (10)}$$

subject to a;

$$\min[\bar{s}_{e3} - \bar{s}_{m2}(b)]^2 \quad \text{Equation (11)}$$

subject to b.

These new parameters a,b pertain to the state of the process one step ahead assuming that the same recipe x is used. From these new parameter values, we can compute the new predicted thickness $\bar{T}_{p3}$ and standard deviation $\bar{s}_{p3}$ using Equation (1). Thus, if the process is drifting we could still predict the mean thickness and standard deviation one step ahead, given that we maintain the recipe as the previous run value. If our desired thickness and standard deviation targets are respectively, $\bar{T}_d$, $\bar{s}_d$ then we can back compute to find the recipe that ought to be used in the next run to prevent the process from drifting. Hence, the problem becomes that of choosing a recipe x such that the targets, $\bar{T}_d$, $\bar{s}_d$ are simultaneously met. Thus, we want $$\bar{T}(x)_{p3} = \bar{T}_d \rightarrow \bar{T}(x)_{p3} - \bar{T}_d = 0 \quad \text{Equation (12)}$$

$$\bar{s}(x)_{p3} = \bar{s}_d \rightarrow \bar{s}(x)_{p3} - \bar{s}_d = 0 \quad \text{Equation (13)}$$

Thus, the recipe to use on the next run to get the mean thickness and standard deviation to target is found by simultaneously solving the two nonlinear Equations (12) and (13). This procedure is repeated till the system converges to the targeted values.

Figure 2:
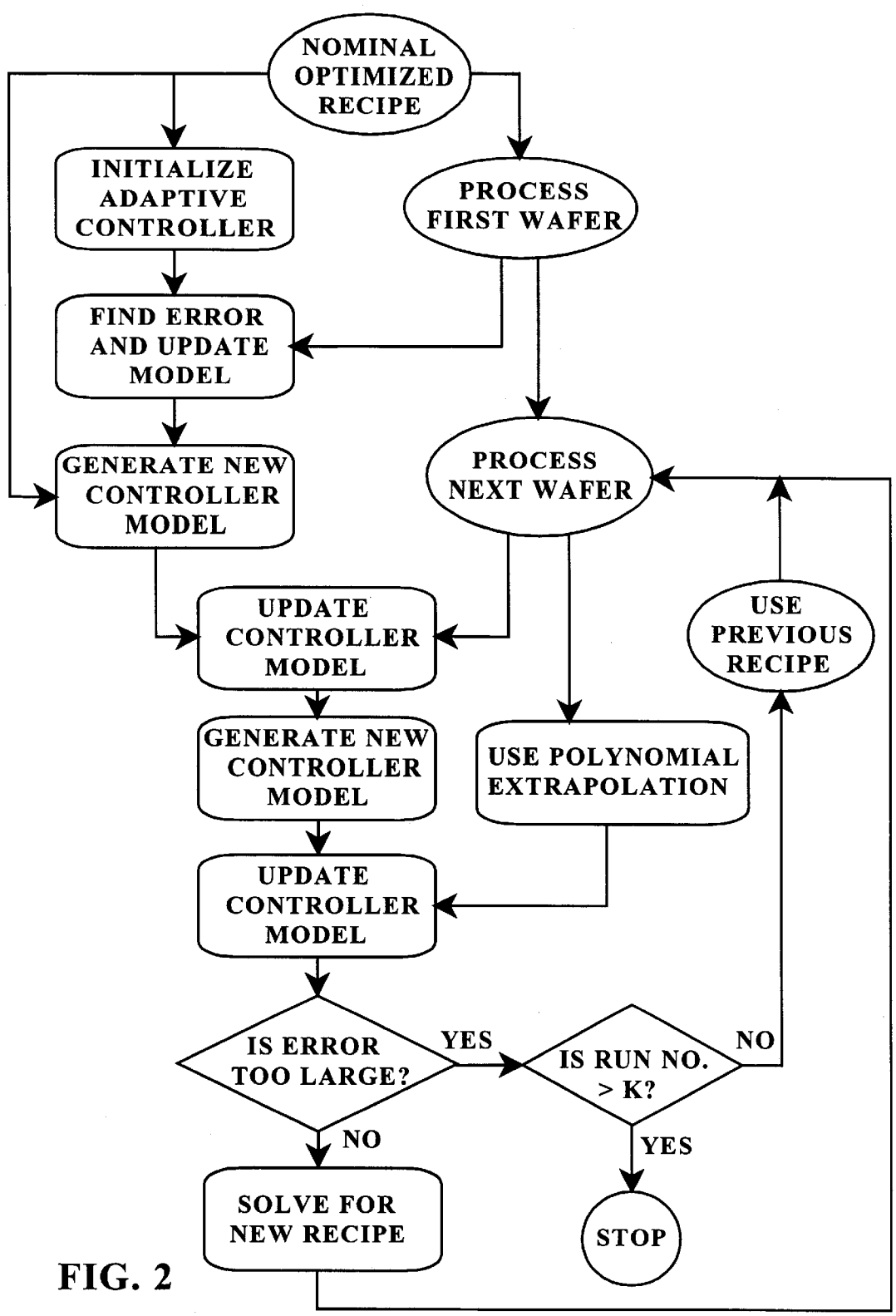
FIG. 2 is a flow chart illustrating a process performed in accordance with the present invention.

A summary of the series of steps for the implementation of the above adaptive control system is shown in FIG. 2 and outlined below:

1. Initialize the adaptive controller by choosing appropriate initial parameter values. Using these parameters and the nominal recipe values x, compute the model predicted thickness $\bar{T}_{m1}$ and sample standard deviation, $\bar{S}_{m1}$ using Equation (1).
2. Process first wafer and compute the real mean thickness $\bar{T}_{r1}$ and sample standard deviation $\bar{s}_{s1}$,
3. Compute the resulting error between the model prediction in 1 and the real process results in 2. Using this error, in conjunction with the least squares process, update the adaptive controller parameters as shown in Equations (6) and (7).
4. Process next wafer and compute $\bar{T}_{r2}$ and $\bar{s}_{r2}$.
5. Update the model parameters again using the last processed wafer.
6. Using available real process data, do polynomial extrapolation to determine the predicted thickness $\bar{T}_{e3}$ and predicted standard deviation $\bar{s}_{e3}$.
7. Update the adaptive controller parameters and compute the new model predicted thickness $\bar{T}_{p2}$ and standard deviation $\bar{s}_{p2}$. This will be the state of the process in the next run if the previous recipe is used.
8. Determine the optimum recipe x, to use to drive the process to the desired targets $\bar{T}_d$ and $\bar{s}_d$ by simultaneously solving the two Equations (12) and (13).
9. Using the recipe obtained in 8 as the current recipe, go to 4 and loop till a stopping condition is met or till the process is stable enough to allow disengagement of the adaptive controller, if necessary.

Figure 7A:
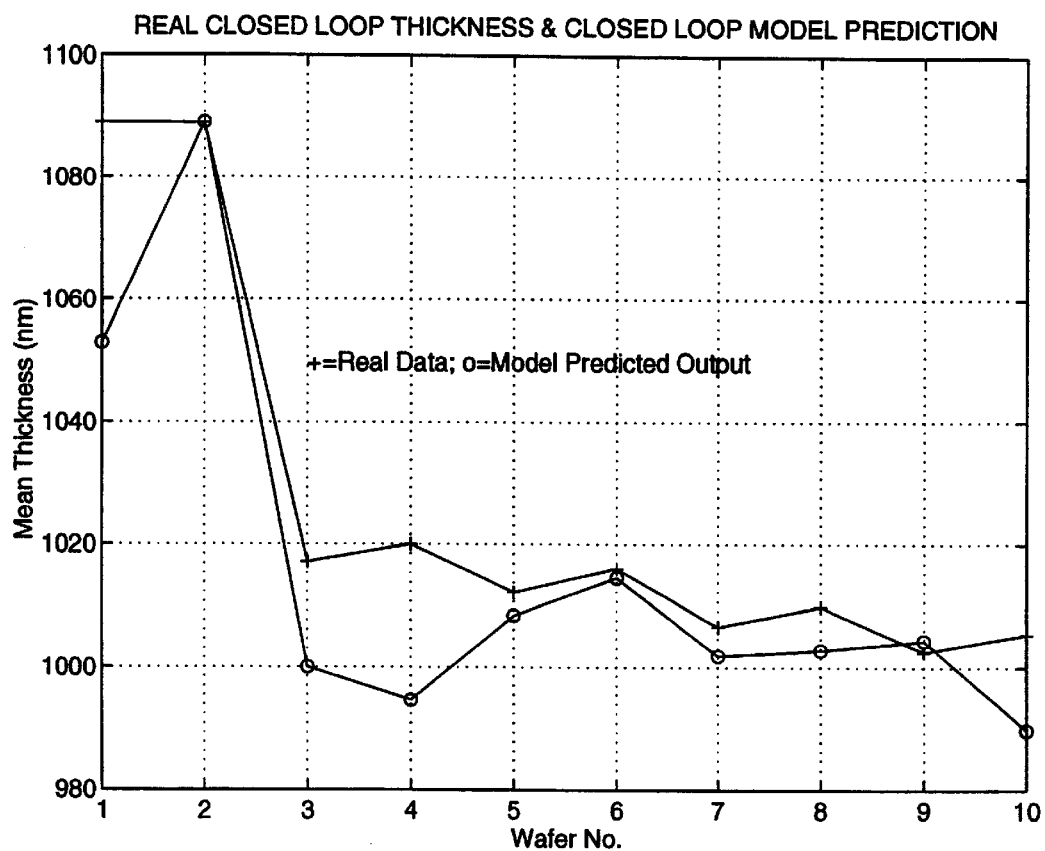
FIG. 7a is a graph showing real process output (+) and adaptive control (closed-loop) simulated outpot (o) of mean photoresist thickness in nanometers as dependent variable vs. run number as independent variable for an example process.
Figure 7B:
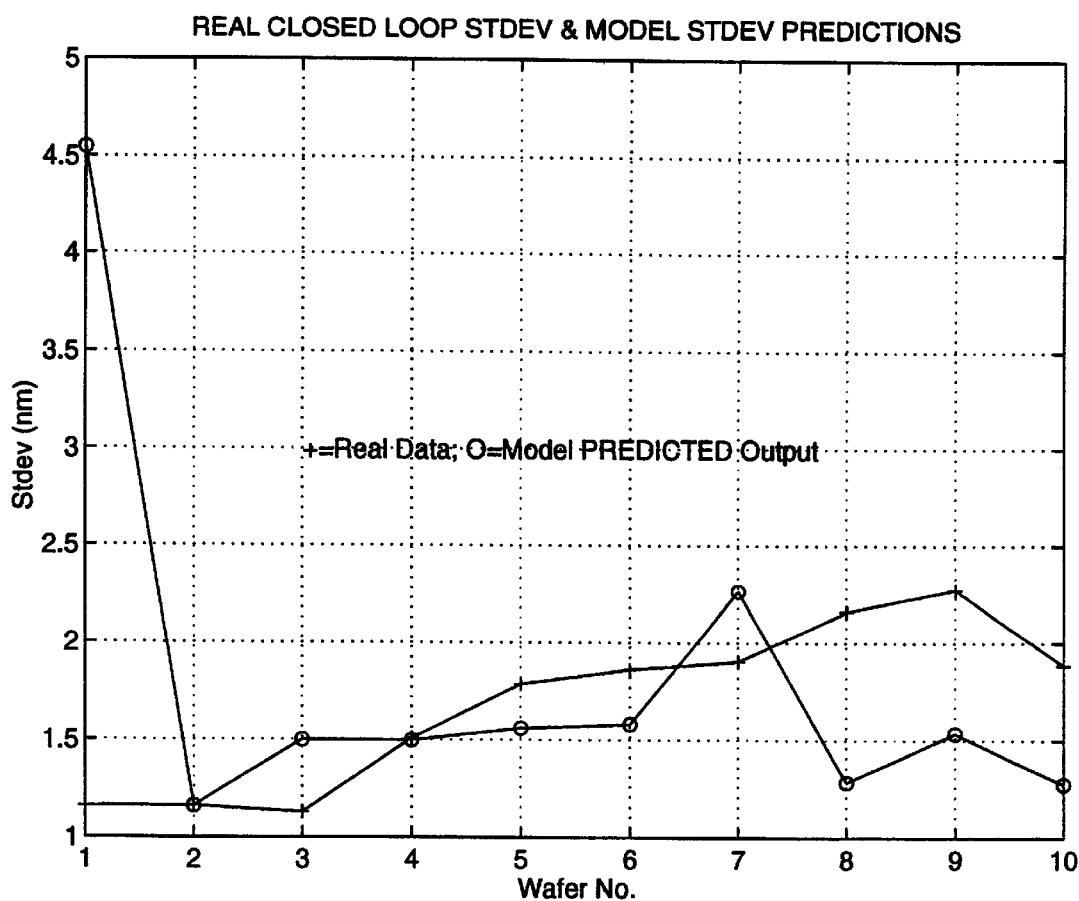
FIG. 7b is a graph showing real process output (+) and adaptive control (closed-loop) simulated output (o) of standard deviation (one-sigma) of photoresist thickness in nanometers as dependent variable vs. run number as independent variable for an example process.

The results obtained by applying this procedure to our test process is summarized in FIGS. 7a and 7b. It can be seen that even though the controller was initialized with parameters that resulted in large initial errors, the controller still converged to the optimum point in a few steps. This fact was confirmed by running a number of experiments and all the results were in close agreement. This shows that the operation of the adaptive controller is not influenced very much by the initial choice of the parameters and that it tends to drive the system towards the optimum operating point. Indeed, for the least squares estimation process, parameters converge after n runs, where n is the number of parameters to be estimated. In this experiment, the calculation of the rate of convergence is complicated by the fact that we are dealing with two adaptive controllers running in parallel: one for the thickness and the other for the standard deviation. Moreover, the update of the parameters is done twice in a loop. In spite of this complication, we can see that the controllers are well bounded and converge. It is interesting to note that as more weight is assigned to the thickness performance measure, the adaptive controller for thickness converges to the target thickness of 1000 nm. However, the weight placed on standard deviation is decreased accordingly and so it was difficult to maintain it at 1.5 nm. After different weights were assigned to the thickness and standard deviation criteria, it became clear that the tool was incapable of delivering more stringent process requirement. At run number 8 (wafer no. 8), the thickness obtained was approximately 1000 nm with a standard deviation of about 2.3 nm. After run 9 (wafer no. 9), the system had settled to the final steady-state value and the standard deviation had started leveling out. It was not possible to get more than ten runs in an uninterrupted sequence with the setup available for the illustrated example.

From the models developed, the sensitivity of the process to changes in the input variables was studied and the key variables were identified. From the sensitivity studies it was clear that a tool that could deliver products with tight tolerances will require that at least some, if not all, of the key process variables have good resolutions and tolerances. This information may in turn serve as a good input to specifying the tolerances and resolutions of components and devices to use in building equipment. For example, the speed resolution and regulation of electric motors to be used in building electrical equipment, and the resolution and accuracy of sensors to use in designing electrical tools, etc. can be specified.

The functional elements of the process and system of FIGS. 1 and 2 may be discrete components or modules of a software program run on a known computer. Alternatively, they may be discrete electrical or electronic components capable of performing the functions described herein. It is believed that one of the ordinary skill in the art having the above disclosure before him could produce these components without undue experimentation.

INDUSTRIAL APPLICABILITY

This invention provides an automated means of optimizing a process and minimizing the run-by-run variability. A novel adaptive controller is used to estimate the characteristics of a process. Polynomial extrapolation is used in predicting future outputs and in conjunction with a second adaptive estimator, a model representing the drifting process can be obtained. Based on this model the correct recipe to use to cancel out the drifting trend can then be computed and applied to prevent the process from drifting.

While the invention has been particularly shown and described with reference to a preferred embodiment thereof, it will be understood by those skilled in the art that various other changes in the form and details may be made therein without departing from the spirit and scope of the invention.

What is claimed is:

1. A method for adaptively controlling a process operating on a sequence of samples according to a recipe having recipe values, said method comprising the steps of:

(a) initializing an adaptive controller by setting initial parameter values and setting nominal recipe values, said adaptive controller being described by a first parameter $T_r$, a standard deviation of said first parameter $s_r$, an extrapolated value $T_{e3}$ of said first parameter, an extrapolated value of standard deviation $s_{e3}$ of said first parameter, a model value $T_{m2}$ (a) of said first parameter, a model value of standard deviation $\bar{s}_{m2}$ (b) of said first parameter, a mean value $\overline{T}(x)_{p3}$ of said first parameter, a mean value of standard deviation $\bar{s}(x)_{p3}$ of said first parameter, a desired mean value $\overline{T}_d$ of said first parameter, and a desired mean value of standard deviation $\bar{s}_d$ of said first parameter;

(b) computing a model-predicted parameter value using first equation $$F(x) = C + \sum_{i=1}^{i=N} [G(i)*dX(i)] + \sum_{i=1}^{i=N}\sum_{j=1}^{j=N}[H(i,j)*dX(i)*dX(j)] \quad \text{Equation (1)}$$

where, $N$ = Number of input variables
$C$ = Constant term
$R$ = Reference vector
$dX$ = $X - R$(If $R = 0$, then $dX = X$; $X$ is a vector of input variables)
$G$ is the gradient vector
$H$ is the Jacobian matrix (c) processing a first sample of said sequence, measuring a first parameter of said first sample multiple times to obtain a mean value and sample standard deviation for said first sample;

(d) computing the resulting error of said first parameter and updating the parameters of said first sample by using equations $$\min[\overline{T}_r - \overline{T}_m(a, x)]^2 \quad \text{Equation (6)}$$

subject to a
and $$\min[\bar{s}_r - \bar{s}_m(a, x)]^2 \quad \text{Equation (7)}$$

subject to b
where
$T_m(a,x) = a_0 + a_1 x_1 + a_2 x_2 + a_{11} x_1^2 + a_{12} x_{12}$
$s_m(b,x) = b_0 + b_1 x_1 + b_2 x_2 + b_{11} x_1^2 + b_{12} x_{12}$ (e) processing at least a second sample and extrapolating to find the value of the next sample point and using it, as if it is the true sample, to update adaptive controller parameters by using equations $$\min[\overline{T}_{e3} - \overline{T}_{m2}(a)]^2 \quad \text{Equation (10)}$$

subject to a;
and $$\min[\bar{s}_{e3} - \bar{s}_{m2}(b)]^2 \quad \text{Equation (11)}$$

subject to b, (f) computing the optimum recipe to use on the next run by using the simultaneous nonlinear equations $$\overline{T}(x)_{p3} = \overline{T}_d \rightarrow \overline{T}(x)_{p3} - \overline{T}_d = 0 \quad \text{Equation (12)}$$

and $$\bar{s}(x)_{p3} = \bar{s}_d \rightarrow \bar{s}(x)_{p3} - \bar{s}_d = 0 \quad \text{Equation (13)}$$

(g) repeating the above steps (b) through (f) until a stopping condition is met.

2. The method for adaptively controlling a process of claim 1, wherein said stopping condition includes a minimum value for time dependence of at least one of said parameter values.

3. An automatic control system for controlling a process described by physical equations or empirical models, said process having input variables and having response variables to be controlled, said automatic control system comprising a computer of known type, programmed with instructions to perform the steps of:

(a) initializing an adaptive controller by setting initial parameter values and setting nominal recipe values, said adaptive controller being described by a first parameter $T_r$, a standard deviation of said first parameter $s_r$, an extrapolated value $T_{e3}$ of said first parameter, an extrapolated value of standard deviation $s_{e3}$ of said first parameter, a model value $T_{m2}$ (a) of said first parameter, a model value of standard deviation $s_{m2}$ (b) of said first parameter, a mean value $\overline{T}(x)_{p3}$ of said first parameter, a mean value of standard deviation $\bar{s}(X)_{p3}$ of said first parameter, a desired mean value $\overline{T}_d$ of said first parameter, and a desired mean value of standard deviation $\bar{s}_d$ of said first parameter;

(b) computing a model-predicted parameter value using first equation $$F(x) = C + \sum_{i=1}^{i=N} [G(i)*dX(i)] + \sum_{i=1}^{i=N}\sum_{j=1}^{j=N}[H(i,j)*dX(i)*dX(j)] \quad \text{Equation (1)}$$

where, $N$ = Number of input variables
$C$ = Constant term
$R$ = Reference vector
$dX$ = $X - R$(If $R = 0$, then $dX = X$; $X$ is a vector of input variables)
$G$ is the gradient vector
$H$ is the Jacobian matrix (c) processing a first sample of said sequence, measuring a first parameter of said first sample multiple times to obtain a mean value and sample standard deviation for said first parameter of said first sample;

(d) computing the resulting error of said first parameter and updating the parameters of said first sample using equations $$\min[\overline{T}_r - \overline{T}_m(a,x)]^2 \quad \text{Equation (6)}$$

subject to a
and $$\min[\bar{s}_r - \bar{s}_m(a,x)]^2 \quad \text{Equation (7)}$$

subject to b
where $T_m(a,x) = a_0 + a_1x_1 + a_2x_2 + a_{11}x_1^2 + a_{12}x_{12}$
$s_m(b,x) = b_0 + b_1x_1 + b_2x_2 + b_{11}x_1^2 + b_{12}x_{12}$ (e) processing at least a second sample and extrapolating to find the value of the next sample point and using it, as if it is the true sample, to update adaptive controller parameters using equations $$\min[\bar{T}_{e3} - \bar{T}_{m2}(a)]^2 \quad \text{Equation (10)}$$

subject to a;
and $$\min[\bar{s}_{e3} - \bar{s}_{m2}(b)]^2 \quad \text{Equation (11)}$$

subject to b, (f) computing optimum recipe values to use on the next run using the simultaneous nonlinear equations $$\bar{T}(x)_{p3} = \bar{T}_d \rightarrow \bar{T}(x)_{p3} - \bar{T}_d = 0 \quad \text{Equation (12)}$$

and $$\bar{s}(x)_{p3} = \bar{s}_d \rightarrow \bar{s}(x)_{p3} - \bar{s}_d = 0 \quad \text{Equation (13)}$$

and substituting said optimum values into said first equation; and (g) repeating the above steps (b) through (f) until a stopping condition is met.

4. The automatic control system of claim 3, wherein said stopping condition includes a minimum value for time dependence of at least one of said parameter values.

* * * * *